US010836210B2

(12) United States Patent
Fuller et al.

(10) Patent No.: US 10,836,210 B2
(45) Date of Patent: Nov. 17, 2020

(54) METHODS OF REDUCING OXYGEN IN TIRE AIR CHAMBERS, COMPOSITIONS AND ASSEMBLIES RELATED THERETO

(71) Applicant: FULLER BROS. INC., Clackamas, OR (US)

(72) Inventors: Tim Fuller, Clackamas, OR (US); Paul Pappidas, Oregon City, OR (US)

(73) Assignee: FULLER BROS. INC., Clackamas, OR (US)

(*) Notice: Subject to any disclaimer, the term of this patent is extended or adjusted under 35 U.S.C. 154(b) by 119 days.

(21) Appl. No.: 16/360,727

(22) Filed: Mar. 21, 2019

(65) Prior Publication Data

US 2019/0217663 A1    Jul. 18, 2019

Related U.S. Application Data

(63) Continuation of application No. PCT/US2017/052389, filed on Sep. 20, 2017.

(60) Provisional application No. 62/398,704, filed on Sep. 23, 2016.

(51) Int. Cl.
*B60S 5/04* (2006.01)
*B60C 5/00* (2006.01)

(52) U.S. Cl.
CPC ............. *B60C 5/004* (2013.01); *B60C 5/001* (2013.01); *B60S 5/043* (2013.01)

(58) Field of Classification Search
CPC . B60C 5/004; B60C 5/001; B60C 5/00; B60S 5/04; B60S 5/043
See application file for complete search history.

(56) References Cited

U.S. PATENT DOCUMENTS

| | | | | |
|---|---|---|---|---|
| 3,370,915 A | * | 2/1968 | Sperberg | C01B 21/02 423/219 |
| 3,515,181 A | | 6/1970 | Sperberg | |
| 3,877,496 A | * | 4/1975 | Sperberg | B60C 5/001 141/4 |
| 6,412,524 B1 | * | 7/2002 | Fogal, Sr. | B60C 29/062 141/100 |
| 6,605,654 B1 | * | 8/2003 | Fang | B29C 73/166 523/166 |
| 7,407,637 B2 | * | 8/2008 | Incavo | B60C 5/001 152/151 |

(Continued)

FOREIGN PATENT DOCUMENTS

| | | |
|---|---|---|
| EP | 1759885 A2 | 3/2007 |
| KR | 101654700 B1 | 9/2016 |

OTHER PUBLICATIONS

PCT/US2017/052389, International Search Report and Written Opinion, dated Nov. 30, 2017, 22 pages.

(Continued)

*Primary Examiner* — Nicolas A Arnett
(74) *Attorney, Agent, or Firm* — Stoel Rives LLP

(57) ABSTRACT

Methods of reducing oxygen in tire air chambers with an oxygen scavenger that contains diethylhydroxylamine are disclosed herein. Compositions including diethylhydroxylamine for reducing oxygen in tire air chambers are disclosed herein. Wheel assemblies including compositions containing diethylhydroxylamine for reducing oxygen in tire air chambers are disclosed herein.

18 Claims, 3 Drawing Sheets

(56) References Cited

U.S. PATENT DOCUMENTS

2006/0032568 A1* 2/2006 Lechtenboehmer ........................ C08G 63/916
152/510
2010/0062609 A1* 3/2010 Sharma ............. H01L 21/67086
438/745

OTHER PUBLICATIONS

"Oxygen Scavengers", For Water (DEHA) Iron Reduction Method, https://www.hach.com/asset-get.download.jsa?id=7639984252, 1 page.
Merck, "Safety Data Sheet according to regulation—N, N-Diethylhydroxylamine for synthesis", http://www.merckmillipore.com/INTERSHO P/web/WFS/Merck-NL-Site/en US/-/EUR/ShowDo cument-File?ProductSKU=MDA-CHEM-818473&Doc umentType=MSD&Documentid=8I8473 SOS EU EN. PDF &DocumentUID=597281&Language;EN&CountryEU&Ori gin= PDP, Mar. 1, 2013, 10 pages.

* cited by examiner

METHODS OF REDUCING OXYGEN IN TIRE AIR CHAMBERS, COMPOSITIONS AND ASSEMBLIES RELATED THERETO

RELATED APPLICATIONS

This application is a continuation of International Application No. PCT/US2017/052389, filed Sep. 20, 2017, published as WO 2018/057556, titled "METHODS OF REDUCING OXYGEN IN TIRE AIR CHAMBERS, COMPOSITIONS AND ASSEMBLIES RELATED THERETO," and claims the benefit of U.S. Provisional Patent Application No. 62/398,704, filed Sep. 23, 2016, titled "METHODS OF REDUCING OXYGEN IN TIRE AIR CHAMBERS, COMPOSITIONS AND ASSEMBLIES RELATED THERETO." The entire contents of each of the foregoing applications are hereby incorporated by reference herein.

TECHNICAL FIELD

The present disclosure relates generally to wheel assemblies. More specifically, the present disclosure relates to methods of reducing oxygen in tire air chambers and also compositions and assemblies related thereto.

BACKGROUND

Vehicles and other equipment used in the transportation, mining, and construction industries typically use pneumatic tires. The air chamber of the pneumatic tires is typically filled with compressed air. In certain environments, the oxygen in the air chamber presents an explosion hazard. Additionally, oxidative degradation of rubber and other tire materials can shorten the life of tires. Pneumatic tires are sometimes filled with nitrogen to avoid the problems associated with oxygen. Nitrogen filling and/or refilling can be impractical in a variety of settings and situations. A need exists for methods of reducing oxygen in tire air chambers.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

DETAILED DESCRIPTION

The present disclosure relates to methods of reducing oxygen in tire air chambers and also compositions and assemblies related thereto.

The methods of reducing oxygen in tire air chambers include introducing a liquid aqueous oxygen scavenger into the air chamber of a tire mounted on a wheel, such as at a ratio of about 0.04 moles or more of the oxygen scavenger per liter of the air chamber. The oxygen scavenger may be present from about 0.05 moles to about 0.10 moles per liter of the air chamber, about 0.06 moles to about 0.09 moles per liter of the air chamber, or about 0.07 moles to about 0.08 moles per liter of the air chamber.

The oxygen scavenger preferably includes diethylhydroxylamine (DEHA) and may also include hydroquinone. By way of example, when present, the hydroquinone may be present from about 0.005 moles to about 0.020 moles per liter of the air chamber, about 0.007 moles to about 0.017 moles per liter of the air chamber, or about 0.009 moles to about 0.013 moles per liter of the air chamber.

The foregoing methods may be applied in a variety of situations. For example, an equipment or vehicle manufacturer at the time of assembling a tire and wheel into a wheel assembly may introduce the liquid aqueous oxygen scavenger into the air chamber of the tire prior to pressurizing the tire. In another example, a purchaser of the wheel assembly (which may be part of a vehicle or piece of equipment) may introduce the liquid aqueous oxygen scavenger into the tire air chamber, such as prior to placing the wheel assembly into service.

Figure 1:
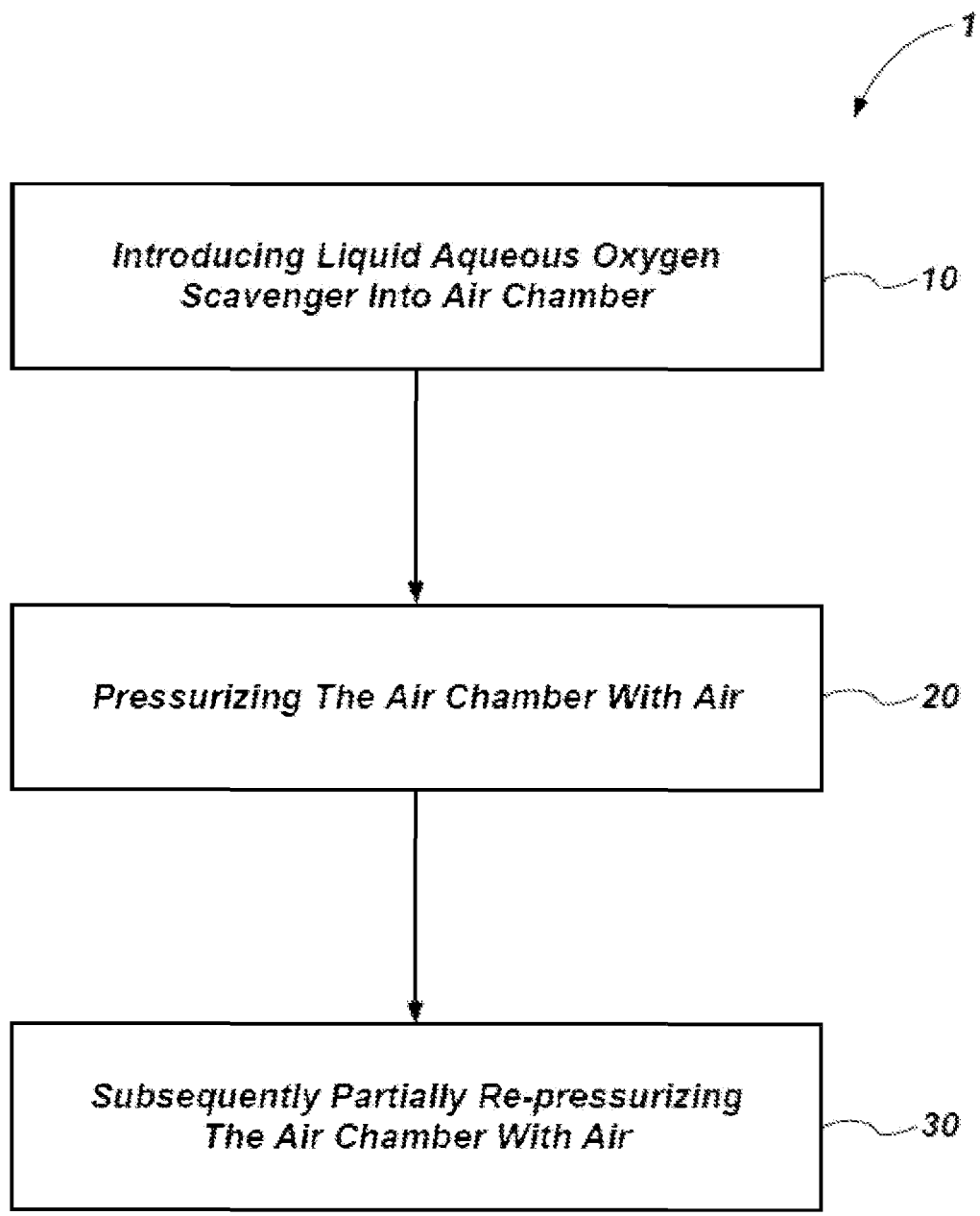
FIG. 1 illustrates one embodiment of a method for reducing oxygen in a tire air chamber.

FIG. 1 illustrates one embodiment of a method 1 for reducing oxygen in a tire air chamber. Step 10 includes introducing a liquid aqueous oxygen scavenger into an air chamber. Step 20 includes pressurizing the air chamber with air. After introduction of the liquid aqueous oxygen scavenger, the tire air chamber may be subsequently filled with either air or nitrogen. In the case of nitrogen, the tire may be initially pressurized with nitrogen, but then subsequently refilled with air. Step 30 includes partially re-pressurizing the air chamber with air, such as part of a routine maintenance program or on an as-needed basis. In some embodiments, step 30 may not be performed.

In some embodiments, when the tire is pressurized with air, the oxygen scavenger is present in a high enough quantity that the oxygen is reduced to less than 5% by volume within 24 hours of filling the air chamber with pressurized air. Additionally, the quantity of oxygen scavenger may be sufficient to reduce the oxygen even after subsequent refills with pressurized air. For example, the initial quantity of the oxygen scavenger may be sufficient that even after a subsequent refill of 15% volume replacement (assuming same pressure before and after) or more, the oxygen is reduced to less than 5% by volume within 24 hours of refilling the air chamber with pressurized air. In another example, the initial quantity of the oxygen scavenger may be sufficient that even after multiple refills of 5% volume replacement, the oxygen is reduced to less than 5% by volume within 24 hours of refilling the air chamber with pressurized air. The initial quantity of the oxygen scavenger may be selected assuming 5% volume replacement with air on a monthly basis and an expected tire life of one year.

In some embodiments, the initial quantity of the oxygen scavenger is selected so as to be substantially consumed after initial tire pressurization, after 12 subsequent refills at 5% volume replacement, or both. For example, the oxygen scavenger may be reduced to less than 0.01 moles per liter of the air chamber. In the case of DEHA, the compound reacts with dissolved oxygen in the aqueous liquid to form acetic acid, nitrogen gas, and water. For hydroquinone, the compound is believed to catalyze the reaction between DEHA and oxygen and to eventually form light alcohols, ketones, and carbon dioxide gas.

DEHA and hydroquinone will both react with copper and iron oxides to form protective passivation films. In some embodiments, the DEHA and hydroquinone are present in sufficient quantities to reduce the oxygen in the air chamber, but are not present in sufficient quantities to sufficiently passivate iron and copper components of the wheel assembly.

Figure 2:
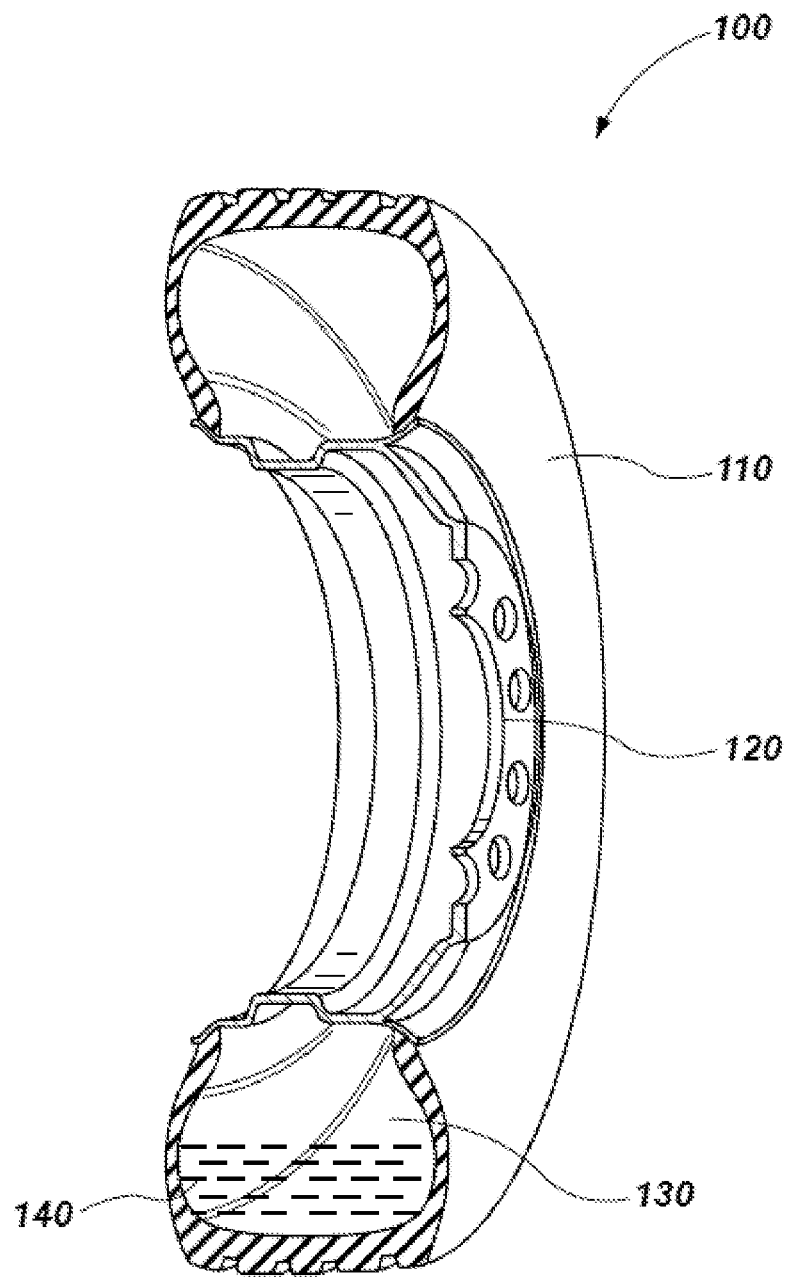
FIG. 2 illustrates a perspective view of a cross-section of one embodiment of a wheel assembly including an aqueous solution comprising an aqueous oxygen scavenger.

FIG. 2 illustrates a perspective view of a cross-section of one embodiment of a wheel assembly 100 including an aqueous solution comprising DEHA. The methods discussed above may be used with the wheel assembly 100. The wheel assembly 100 includes a tire 110 mounted on a wheel 120, thereby forming an air chamber 130. An aqueous solution 140 including diethylhydroxylamine (DEHA) is present in the air chamber. The liquid aqueous oxygen scavenger discussed above may be the aqueous solution 140.

The composition of the aqueous solution 140 may include at least about 10% by weight DEHA, such as about 10% to about 80% by weight. For example, the DEHA may be present at about 15% to about 60% by weight, including about 25% to about 45% by weight, of the aqueous solution 140. Hydroquinone may be present at about 1% to about 10% by weight of the aqueous solution 140. The aqueous solution 140 may further include other wheel assembly protective components, such as, one or more of: a leak preventer; a brass corrosion inhibitor; a steel corrosion inhibitor; an aluminum corrosion inhibitor; and an antifreeze. For example, the aqueous solution 140 may include at least about 10% by weight diethylhydroxylamine (DEHA); and one or more of: at least about 1% by weight of a leak preventer; at least about 0.1% by weight of a brass corrosion inhibitor; at least about 0.1% by weight of a steel corrosion inhibitor; at least about 0.1% by weight of an aluminum corrosion inhibitor; and at least about 0.1% by weight of an antifreeze.

In some embodiments, the aqueous solution 140 consists essentially of at least about 10% by weight diethylhydroxylamine (DEHA); and one or more of: at least about 1% by weight of a leak preventer; at least about 0.1% by weight of a brass corrosion inhibitor; at least about 0.1% by weight of a steel corrosion inhibitor; at least about 0.1% by weight of an aluminum corrosion inhibitor; and at least about 0.1% by weight of an antifreeze.

One example of a leak preventer is a salt of benzoic acid, such as sodium benzoate. An exemplary range of the leak preventer is about 1% to about 10% by weight of the aqueous solution, such as about 2% to about 8% or about 3% to about 7%.

One example of a brass corrosion inhibitor is a benzotriazole compound, such as tolyltriazole. An exemplary range of the brass corrosion inhibitor is about 0.1% to about 10% by weight of the aqueous solution, such as about 0.1% to about 5% by weight.

One example of a steel corrosion inhibitor is a nitrite salt, such as sodium nitrite. An exemplary range of the steel corrosion inhibitor is about 0.1% to about 5%, such as about 0.5% to about 2%, by weight of the aqueous solution.

An exemplary range of the aluminum corrosion inhibitor is about 0.1% to about 5%, such as about 0.5% to about 2%, by weight of the aqueous solution.

One example of an antifreeze is a glycol, such as ethylene glycol or propylene glycol. An exemplary range of the antifreeze is about 0.1% to about 5%, such as about 0.5% to about 2%, by weight of the aqueous solution.

In some embodiments, the volume of the aqueous solution 140 initially present in the air chamber 130 may be selected so as to provide a desired initial quantity of DEHA. For example, the volume of the aqueous solution 140 introduced into the air chamber 130 may be about 0.5 vol % to about 5 vol %, such as about 1.0 vol % to about 3 vol % or about 1.2 vol % to about 2.0 vol %.

It should be understood that the aqueous solution 140 may be contained and transported in a variety of containers, such as bottles or drums, prior to introduction of the composition into the air chamber 130.

Turning now to exemplary compositions and testing of those compositions, compositions comprising different quantities of DEHA, among other things, were tested. Three formulations were tested with different concentrations of DEHA. Formulation A included, on a per liter basis, 400 grams of DEHA (added as an aqueous solution of 85% DEHA), 75 grams of hydroquinone, 60 grams of sodium benzoate, and 7.8 grams of sodium nitrite. Formulation B included, on a per liter basis, 430 grams of DEHA (added as an aqueous solution of 85% DEHA), 86 grams of hydroquinone, 60 grams of sodium benzoate, and 7.8 grams of sodium nitrite. Formulation C included, on a per liter basis, 400 grams of DEHA (added as an aqueous solution of 85% DEHA), 80 grams of hydroquinone, 60 grams of sodium benzoate, and 7.8 grams of sodium nitrite.

Formulation A in terms of weight percent contained about 37 wt % DEHA, about 7 wt % hydroquinone, about 6 wt % sodium benzoate, and about 0.7 wt % sodium nitrite, with balance consisting primarily of water. Formulation B in terms of weight percent contained about 38 wt % DEHA, about 8 wt % hydroquinone, about 5 wt % sodium benzoate, and about 0.7 wt % sodium nitrite, with balance consisting primarily of water. Formulation C in terms of weight percent contains about 36 wt % DEHA, about 7 wt % hydroquinone, about 6 wt % sodium benzoate, and about 0.7 wt % sodium nitrite, with balance consisting primarily of water.

Figure 3:
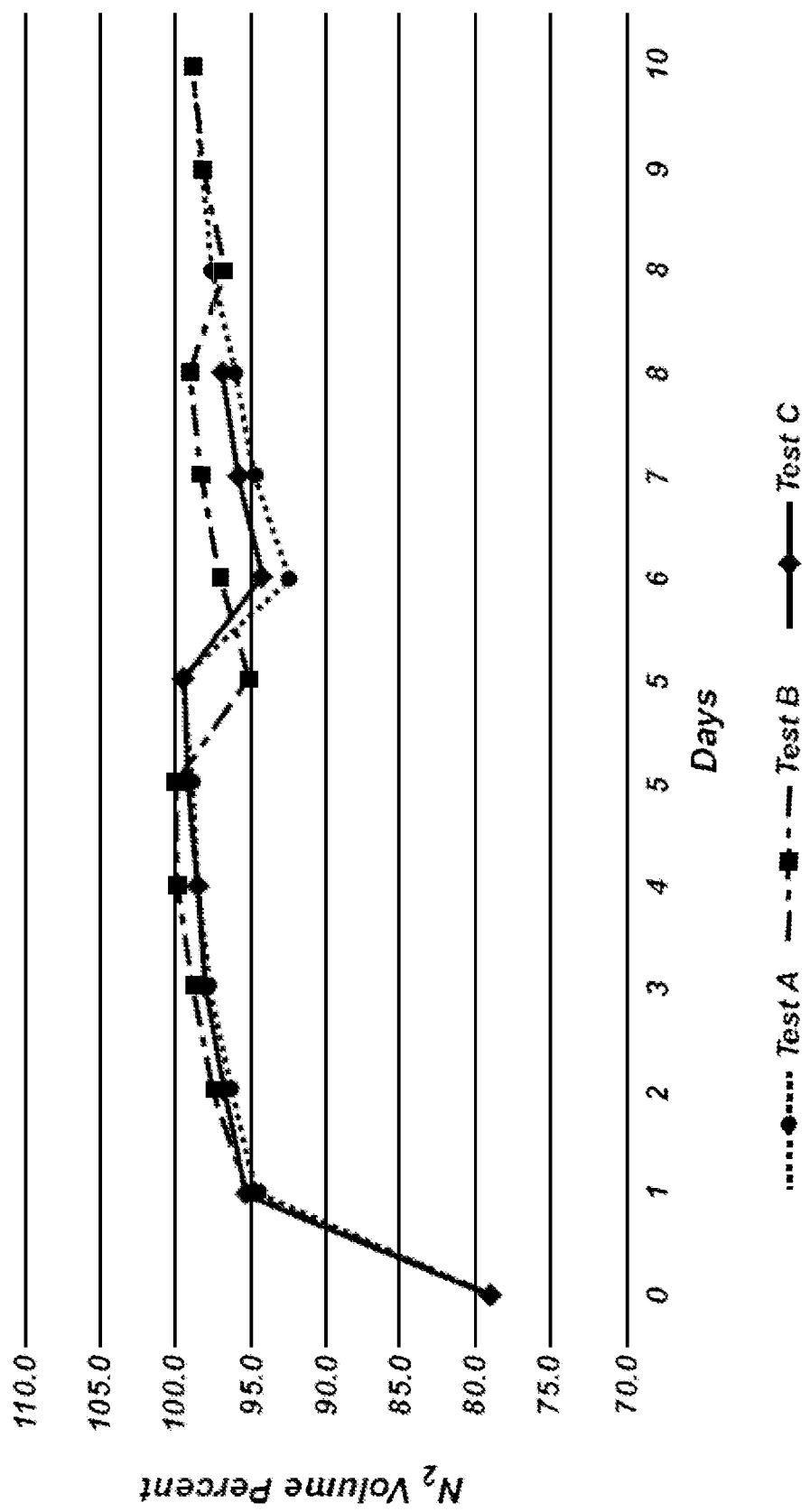
FIG. 3 illustrates the results of oxygen reduction with exemplary oxygen scavenger compositions.

FIG. 3 illustrates the results of oxygen reduction for Tests A, B, and C with Formulations A, B, and C, respectively. A 9 gal (34.1 liters) pressure tank was used for testing. For each test 600 mL of the formulation was added to the tank. That equates to about 1.8 vol % of the volume of the tank. The tank was then pressurized to 100 psi and heated to 150° F. The tank was continuously agitated to simulate rolling of a tire. Every 24 hours the nitrogen level was measured using a Haltec Nitrogen meter that is standard in the tire industry for this purpose.

For Tests A and C, the initial quantity of DEHA was about 0.08 moles of DEHA per liter of the air chamber. For Test B, the initial quantity of DEHA was about 0.09 moles of DEHA per liter of the air chamber. For Test A the initial quantity of hydroquinone was about 0.012 moles of DEHA per liter of the air chamber. For Test B the initial quantity of hydroquinone was about 0.015 moles of DEHA per liter of the air chamber for Formulation B. For Test C the initial quantity of hydroquinone was about 0.013 moles of DEHA per liter of the air chamber. At 100 psi (114.7 psia) and 150° F., the moles of $O_2$ per liter of space (assuming the formulations were incompressible) was initially 0.06.

As depicted in FIG. 3, the $N_2$ volume percent goes from about 78% (standard for air) to about 95% within one day of filling the air chamber with pressurized air. This indicates that the oxygen volume percent reduced to less than 5%. At day five, gas was released from the air chamber until the pressure dropped to about 75 psi, simulating the gradual gas loss that occurs during normal tire use. The tank was refilled with air until 100 psi was reached. Initially, the $N_2$ volume percent dropped due to the addition of air, but within 24 hours, the $N_2$ volume percent returned to at least about 95%, without the addition of additional DEHA. For Test B, at day 8 gas was again released from the air chamber until the pressure dropped to about 85 psi. The tank was refilled with air until 100 psi was reached. Initially, the $N_2$ volume percent dropped due to the addition of air, but within 24 hours, the $N_2$ volume percent returned to about 99%, without the addition of additional DEHA.

By way of example, if 25 gallons of Formulations A, B, and C were introduced into a Bridgestone 40.00R57 tire mounted on a wheel, then for Tests A and C, the initial quantity of DEHA would be about 0.07 moles of DEHA per liter of the air chamber and for Test B, the initial quantity of DEHA would be about 0.08 moles of DEHA per liter of the air chamber. The initial quantity of hydroquinone would be about 0.012 moles of DEHA per liter of the air chamber for Formulations A and C. The initial quantity of hydroquinone would be about 0.013 moles of DEHA per liter of the air chamber for Formulation B. This assumes the air chamber created by the tire and wheel has a volume of 1474 gallons. The vol % of each formulation would be about 1.7. This also assumes that after introduction of each formulation the air chamber would be pressurized with air to about 100 psi and that the temperature of the tire would be about 70° F.

Any methods disclosed herein include implicitly or explicitly one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, only a portion of a method described herein may be a separate method. Stated otherwise, some methods may include only a portion of the steps described in a more detailed method.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments and examples, various features are sometimes grouped together in a single embodiment, example, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A method of reducing oxygen in an air chamber of a tire, the method comprising:
    introducing a liquid aqueous oxygen scavenger into an air chamber of a tire mounted on a wheel, wherein the oxygen scavenger comprises diethylhydroxylamine (DEHA) and the DEHA is present from 0.05 moles to 0.20 moles per liter of the air chamber.

2. The method of claim 1, wherein the oxygen scavenger further comprises hydroquinone.

3. The method of claim 2, wherein the hydroquinone is present from about 0.005 moles to about 0.020 moles per liter of the air chamber.

4. The method of claim 1, further comprising pressurizing the air chamber with air comprising about 21% oxygen by volume.

5. The method of claim 4, wherein the oxygen scavenger is present in a high enough quantity that the oxygen is reduced to less than 5% by volume within 24 hours of filling the air chamber with pressurized air.

6. The method of claim 5, further comprising subsequently refilling the air chamber with up to 15% by volume of replacement air wherein the oxygen scavenger is present in a high enough quantity that the oxygen is reduced to less than 5% by volume within 24 hours of refilling the air chamber with pressurized air.

7. The method of claim 5, further comprising subsequently refilling the air chamber with up to 5% by volume of replacement air three times and wherein the oxygen scavenger is present in a high enough quantity that the oxygen is reduced to less than 5% by volume within 24 hours of each refill of the air chamber with pressurized air.

8. The method of claim 7, wherein after 12 subsequent refills with up to 5% by volume of replacement air each time, the oxygen scavenger is reduced to less than 0.01 moles per liter of the air chamber.

9. The method of claim 4, further comprising filling the air chamber with nitrogen subsequent to introducing the liquid aqueous oxygen scavenger to the air chamber and then introducing the air into the air chamber after the tire has been put into service.

10. A wheel assembly comprising:
    a wheel;
    a tire mounted on the wheel and forming an air chamber with the wheel; and
    an aqueous solution comprising diethylhydroxylamine (DEHA) present in the air chamber at 0.05 moles to 0.20 moles per liter of the air chamber.

11. The wheel assembly of claim 10, wherein the aqueous solution further comprises one or more of: a leak preventer; a brass corrosion inhibitor; a steel corrosion inhibitor; an aluminum corrosion inhibitor; and an antifreeze.

12. The wheel assembly of claim 10, wherein the aqueous solution comprises:
    at least about 10% by weight diethylhydroxylamine (DEHA); and
    one or more of:
    at least about 1% by weight of a leak preventer;
    at least about 0.1% by weight of a brass corrosion inhibitor;
    at least about 0.1% by weight of a steel corrosion inhibitor;
    at least about 0.1% by weight of an aluminum corrosion inhibitor; and
    at least about 0.1% by weight of an antifreeze.

13. The wheel assembly of claim 12, wherein the DEHA comprises about 10% to about 80% by weight of the aqueous solution.

14. The wheel assembly of claim 12, further comprising hydroquinone.

15. The wheel assembly of claim 12, wherein the leak preventer comprises a salt of benzoic acid.

16. The wheel assembly of claim 12, wherein the brass corrosion inhibitor comprises a benzotriazole compound.

17. The wheel assembly of claim 12, wherein the steel corrosion inhibitor comprises a nitrite salt.

18. The wheel assembly of claim 12, wherein the antifreeze comprises a glycol.

* * * * *